May 5, 1931.  L. F. MOODY  1,803,673
HYDRAULIC TURBINE
Original Filed June 25, 1920
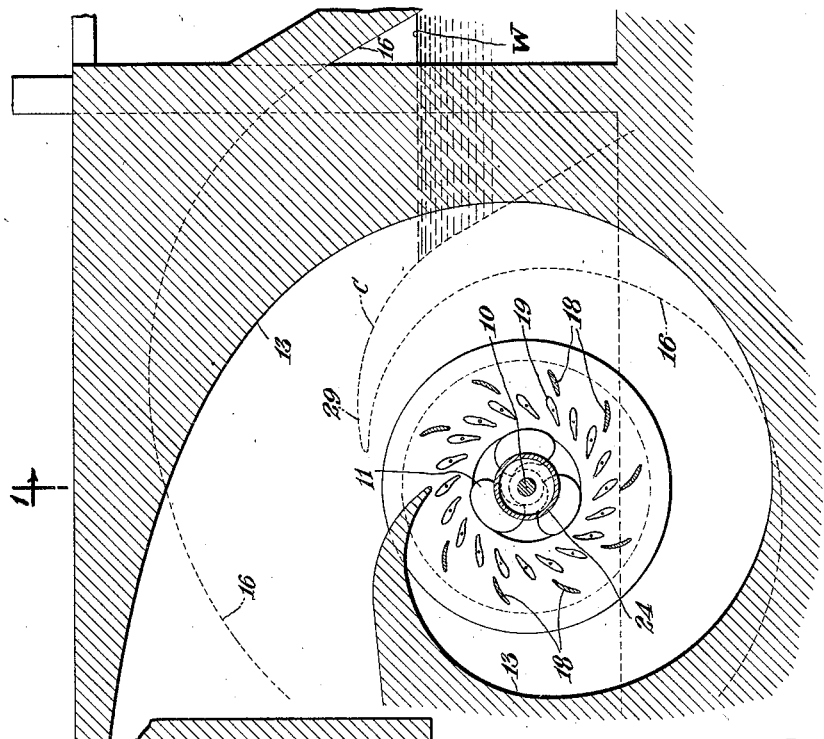
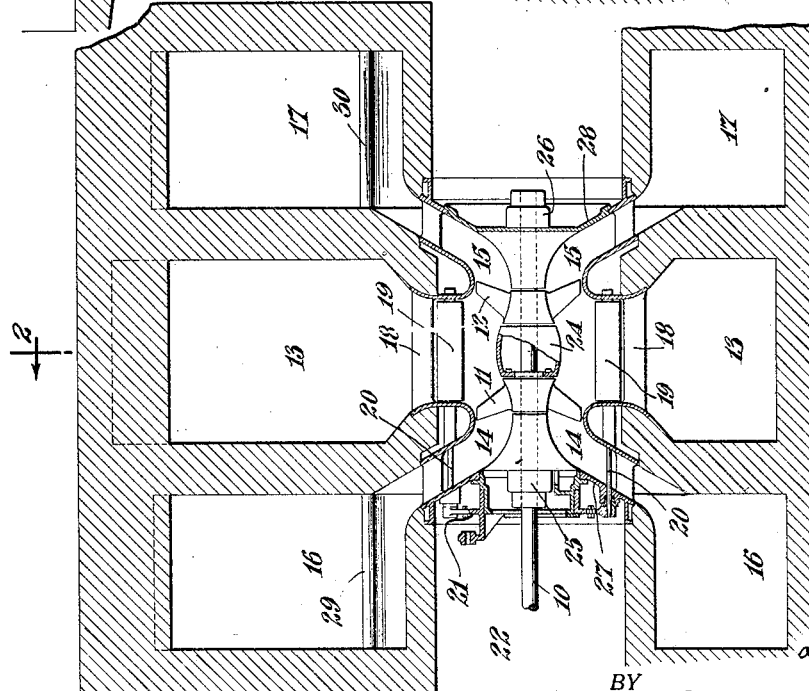
INVENTOR
Lewis F. Moody
BY
Edwards, Lager & Bower
his ATTORNEYS Patented May 5, 1931

1,803,673

UNITED STATES PATENT OFFICE

LEWIS FERRY MOODY, OF PHILADELPHIA, PENNSYLVANIA

HYDRAULIC TURBINE

Original application filed June 25, 1920, Serial No. 391,583. Divided and this application filed March 29, 1926. Serial No. 98,081.

This invention relates to hydraulic turbines and particularly to turbines of the horizontal type of high specific speed through which large quantities of water flow at high velocity head compared to the net head on the plant, and to turbines having wicket gate or movable guide vane means for regulating the flow.

The object of the invention is to provide a turbine installation in which large quantities of water can be handled within a limited space and within which the water can be set into motion at high velocity and again retarded to a low velocity at discharge with a mimimum loss of head, and may impart to the turbine runner a high velocity of rotation.

A further object of the invention is to provide such a turbine with an operating mechanism for controlling power and speed so arranged that the working parts are readily accessible outside of the water passages while the turbine is in operation.

A still further object of the invention is to provide a turbine in which the intake and outflow passages and the controlling means are adapted to produce a whirling body of water within which the runner rotates at high speed, and to decelerate the velocity of whirl in a draft tube spreading outward away from the turbine axis on all sides so as efficiently to regain the kinetic energy of the water leaving the runner. The turbine to which the specific features of this invention are adapted is one having propeller type runners, that is, unshrouded axial or approximately axial flow runners having a small number of vanes. In order to enable such a runner to operate at high velocity a draft tube from the turbine expands radially at its discharge end to a diameter considerably greater than that of the runner so that the water may leave the runner with a considerable velocity of whirl, this whirl being efficiently decelerated and the water leaving the discharge end of the draft tube at low velocity.

Further objects of the invention, particularly in the arrangement of the turbine units and passages in the power house, will appear from the following description taken in connection with the accompanying drawings in which:

Fig. 1 is a vertical sectional view of a turbine installation taken on line 1—1 of Fig. 2;

Fig. 2 is a vertical sectional view taken on the line 2—2 of Fig. 1.

In the embodiment of the invention illustrated a turbine shaft 10 is horizontal and is provided with a pair of runners 11 and 12 receiving the flow from a single intake passage 13, discharging it in opposite directions through draft tubes 14 and 15 into discharge passages 16 and 17. The runner blades as shown in Figs. 1 and 2 have a relatively large circumferential extent and a relatively small axial extent due to which the blades are inclined at a smaller angle with respect to the plane of runner rotation than to a plane containing the runner axis. The stay vanes of the speed ring 18 direct the flow from the intake volute passage 13 to the adjustable guide vanes 19 controlled by stems 20 extending through draft tube 14 to control means 21 in the end of a recess 22 in the power house wall. A central hub 24 surrounds shafts 10 between the hubs of runners 11 and 12, and at each side of the runners the shaft is journaled in bearings 25 and 26 in conical projections 27 and 28 extending inward from the foundation walls and forming the inner surfaces of draft tubes 14 and 15. When runners of axial flow type are used, the enlarged central hub 24 can be reduced in diameter and formed as a straight sleeve between the runners or could be omitted altogether. The intake volute 13 wraps around the runners at the middle and the discharge passages 16 and 17 at each side wrap around circular projections from the foundation walls, giving a very compact arrangement. Fixed stay vanes extend across the draft tubes 14, 15 to connect the walls 27, 28 to the opposite walls. The discharge passages 16 and 17 are volute in form as indicated in dotted lines in Fig. 2 and may have their baffles 29 and 30 at the top forming crests C between the draft tubes and the tail water W. The discharge passages are therefore siphonic in form and with the intake passages closed the turbine passages may be pumped empty at any time without providing tail gates if the turbines are so placed that the crests C are higher than the maximum tail water elevation.

This application is a division of the co-pending application of L. F. Moody, Serial No. 391,583, filed June 25, 1920, for hydraulic turbine, now Patent No. 1,656,889, issued January 17, 1928.

I claim:

1. In a hydraulic turbine the combination with an intake passage of a plurality of runners supplied thereby, a discharge space for each runner, adjustable guide vanes in said intake passage, and stems for said adjustable guide vanes passing through one of said discharge spaces.

2. In a hydraulic turbine the combination with volute inflow guiding means adapted to impart a whirl to the flow, of means for guiding said whirling inflow in opposite directions along the runner axis, a plurality of turbine runners, with oppositely directed spreading draft tubes receiving the discharge from said runners.

3. In a hydraulic turbine the combination with inflow guiding means adapted to impart a whirl to the flow, of means for guiding said whirling inflow in opposite directions along the runner axis, a plurality of turbine runners with oppositely directed spreading draft tubes receiving the discharge from said runners, and volute discharge passages receiving the outflow from said draft tubes.

4. In a hydraulic turbine the combination with inflow guiding means adapted to impart a whirl to the flow, of means for guiding said whirling inflow in opposite directions along the runner axis, a plurality of turbine runners, with oppositely directed spreading draft tubes receiving the discharge from said runners, and volute discharge passages receiving the outflow from said draft tubes having baffles forming crests between the turbine parts and the tail water and rising above the tail water level.

5. In a hydraulic turbine the combination with a turbine runner having a horizontal shaft, of means, including a discharge passage receiving the discharge from said runner and having a crest above the level of the tail water, forming a siphon between the turbine and the tail water whereby the tail water, so long as its level is below the elevation of the crest, is prevented from flowing back to the runner.

6. In a hydraulic turbine the combination with a volute intake passage, of discharge passages at opposite sides thereof, turbine runners and oppositely directed spreading draft tubes between said intake and discharge passages, and adjustable guide vanes in said intake passage with stems passing through one of said draft tubes.

7. In a hydraulic turbine the combination with a volute intake passage, of discharge passages at opposite sides thereof, turbine runners and oppositely directed spreading draft tubes between said intake and discharge passages, adjustable guide vanes in said intake passage with stems passing through one of said draft tubes, and operating means for said guide vanes within the foundation space surrounded by one of said discharge passages.

8. A draft tube for a hydraulic turbine comprising a volute passage expanding in a vertical plane and a discharge passage receiving the discharge tangentially therefrom and discharging below the level of the tail water, said draft tube having a crest above the level of the tail water so that all of the flow through the draft tube must rise and pass over said crest before discharging into the tail water.

9. A draft tube for a hydraulic turbine comprising a volute passage expanding in a vertical plane and a discharge passage receiving the discharge tangentially therefrom and discharging below the level of the tail water, said draft tube having means, including a crest above the level of the tail water, forming a siphon between the turbine and the tail water whereby the tail water, so long as its level is below the elevation of the crest, is prevented from flowing back to the runner.

10. In a hydraulic turbine the combination with a pair of oppositely directed runners, of a single set of guide vanes for the flow to both runners, a central hub surrounding the turbine shaft between said runners, and a transition space between said guide vanes and said central hub.

11. In a hydraulic turbine the combination with oppositely directed runners having unshrouded blades, of a single set of guide vanes for the flow to both runners, a central hub of materially less diameter than the runner diameter at the blade tips surrounding the turbine shaft between said runners, and a transition space between said guide vanes and said central hub.

12. In a hydraulic turbine the combination with oppositely directed runners, of a single set of guide vanes for the flow to both runners, a central hub of materially less diameter than the runner tips surrounding the turbine shaft between said runners, and separate draft tubes for said runners having inner walls continuous in contour with the runner hubs.

13. In a hydraulic turbine the combination with a pair of oppositely directed runners of the unshrouded propeller type, of a single set of guide vanes for the flow to both of said runners, a central hub surrounding the turbine shaft between said runners and connecting their hubs, said hubs being of less diameter than said guide vanes so as to leave a continuous transition space between said guide vanes and said hubs in which the flow from the guide vanes turns from the radial inward direction to an approximately axial direction before entering said runners.

14. In a hydraulic turbine the combination with a pair of oppositely directed runners, of a central hub between said runners, of materially less diameter than the diameter of the runner at the blade tips.

15. In a hydraulic turbine the combination with a pair of oppositely directed runners of the unshrouded propeller type, of a central hub between said runners of relatively small diameter as compared to the diameter of the runner at the blade tips.

16. In a hydraulic turbine the combination with oppositely directed runners having a common intake passage, of separate draft tubes, said draft tubes having inner walls continuous in contour with the runner hubs.

17. In a hydraulic turbine the combination with oppositely directed runners having a common intake passage, of separate draft tubes, said draft tubes having inner walls continuous in contour with the runner hubs, said inner walls provided with bearings for the turbine shaft.

18. A rotary hydraulic machine having in combination two oppositely disposed unshrouded impellers, a single central passage between said impellers, a transition space being bounded on the outside by surfaces of revolution smoothly curving from the impeller tips to the casing entrance and bounded on the inside by a central hub which is continuously in contour with the impeller hubs, the maximum diameter of said central hub being slightly larger than the maximum diameter of the impeller hubs.

19. A hydraulic machine comprising coaxial rotors, means for directing and whirling the fluid flow toward said rotors, and means whereby fluid flowing to each of said rotors passes through a transition space, said directing means including an inlet passage entirely surrounding the axis of said rotor.

20. A rotary hydraulic machine comprising oppositely disposed rotors each having a hub with unshrouded blades extending outwardly therefrom, and being inclined at a relatively small angle with respect to the direction of runner rotation in comparison with the angle said blades have to a plane containing the runner axis, means for conducting fluid to and from each of said rotors, including means for whirling the fluid and varying its axial flow velocity, and means forming a transition space for the fluid flowing relative to said rotors.

21. A hydraulic machine comprising a pair of oppositely disposed rotors each having a hub with blades extending outwardly therefrom, means forming intake and outlet passages for each rotors, guide vanes for whirling the flow to said rotors, and means whereby fluid flow to each of said rotors passes through a transition space prior to engagement with said rotors, and means for gradually decelerating the flow discharged from said rotors.

22. A hydraulic machine comprising a pair of oppositely disposed rotors each having a hub with blades extending outwardly therefrom, means forming intake and outlet passages for each rotor, guide vanes for whirling the flow to said rotors, means whereby fluid flow to each of said rotors passes through a transition space prior to engagement with said rotors, and means forming a discharge passage having an increasing cross-sectional area in the direction of flow whereby the fluid velocity is reduced.

23. A rotary hydraulic machine comprising a horizontal shaft and a rotor mounted thereon, means forming inlet and discharge passages therefor, means forming a basin with which said discharge passage communicates and having normally a liquid level above the rotor axis, said discharge passage being so arranged as to prevent flow of fluid from said basin to said rotor during a normal level of the liquid in said basin.

24. A hydraulic machine comprising a horizontal shaft carrying a pair of oppositely disposed rotors, inlet and discharge passages therefor, means forming a basin for said discharge passage and having normally a liquid level above the rotor axis, and also having a crest above the normal level in said basin whereby a normal level of fluid in said basin is prevented from flowing backwardly to said rotors.

25. A hydraulic machine comprising coaxial substantially axial flow rotors, means for directing flow thereto and for whirling the same, means whereby fluid flowing to each of said rotors passes through a common transition space of large axial extent relative to its radial width and containing a continuous body of water from rotor to rotor, and means for relatively gradually decelerating the flow discharge from said rotors.

26. A hydraulic machine comprising coaxial three-bladed rotors of the substantially axial flow type, and means for directing and whirling the fluid flow toward said rotors and for conducting the flow therefrom, including fluid passages, certain of which are common to both of said rotors, said whirling means being symmetrically disposed around the turbine axis.

27. A hydraulic machine comprising coaxial rotors, means for directing and whirling fluid flowing toward said rotors and for conducting the flow therefrom, including an inlet passage, having a transition space common to each of said rotors, said whirling means including guide vanes substantially symmetrically disposed around the turbine axis.

LEWIS FERRY MOODY.